G. P. BOPP.
VALVE.
APPLICATION FILED JAN. 2, 1915.
1,156,049.  Patented Oct. 12, 1915.
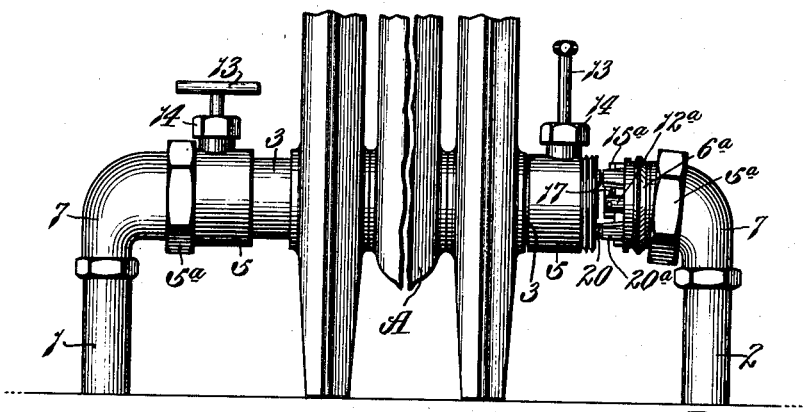
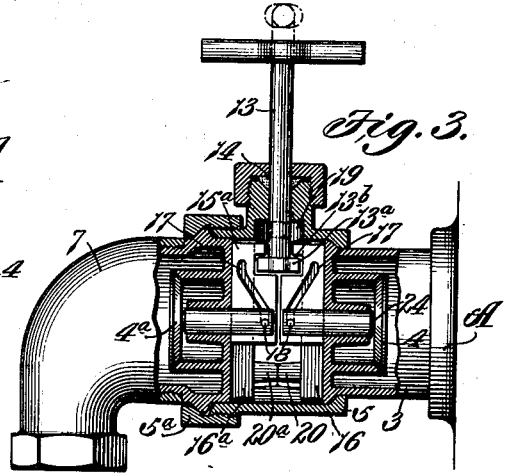
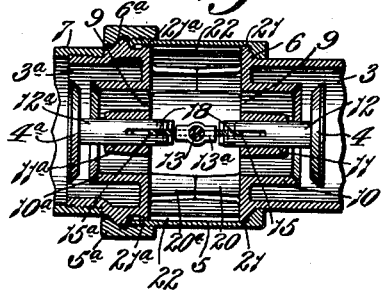
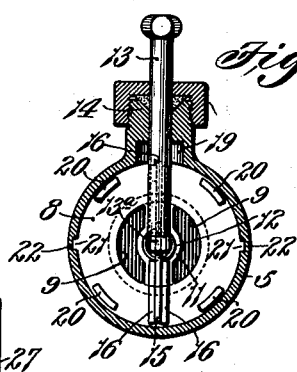
Witnesses:
Geo. R. Radson
Jas. Clark
Inventor
Gustave P. Bopp.
By Bakewell & Churchill attys.

UNITED STATES PATENT OFFICE.

GUSTAVE P. BOPP, OF KIRKWOOD, MISSOURI.

VALVE.

1,156,049.  Specification of Letters Patent.  Patented Oct. 12, 1915.

Application filed January 2, 1915. Serial No. 241.

*To all whom it may concern:*

Be it known that I, GUSTAVE P. BOPP, a citizen of the United States, residing at Kirkwood, St. Louis county, Missouri, have invented a certain new and useful Improvement in Valves, of which the following is a full, clear, and exact description, such as will enable others skilled in the art to which it appertains to make and use the same.

This invention relates to valves, and has for its main object to provide a valve which is so constructed that two sections of a conduit or passage-way can be separated or taken apart, or a conduit can be disconnected from an object with which it coöperates without the necessity of emptying the passage-way or conduit or discharging the contents of same.

Another object is to provide a valve that comprises a separable body portion, each part of which is equipped with a valve that is adapted to act as a closure for one section of a conduit or passage-way in which the complete valve is arranged, said body portion being so constructed that the parts of same can be completely detached or separated when said independent valves are closed, and thus enabling one section of the conduit or passage-way to be moved relatively to the other without liability of the contents of the conduit escaping. And still another object is to provide a valve that comprises a plurality of valves, each of which is adapted to act as a closure for a separate port or section of a passage-way, a common means for actuating said valves and a body portion composed of a plurality of separable parts or portions, each of which carries one of said valves.

Other objects and desirable features of my invention will be hereinafter pointed out.

I have herein illustrated my improved valve used in connection with a hot water heating system for controlling the passage of the water into and out of the radiators, but I wish it to be understood that my invention is not limited to a valve that is used for the purpose mentioned, for a valve embodying my broad idea can be used for any purpose where it is desirable or necessary at certain times to disconnect an object from the conduit that coöperates with same, or disconnect adjacent sections of a valved passage-way or conduit.

As is well known, each radiator of a hot water heating system is provided with two valves, one for controlling the supply of water to the radiator and the other for controlling the passage of the water from the radiator. The water circulates through the radiators and the supply and return pipes continually when the system is in use, so that normally the radiators and the circulating pipes of the system are filled with water. If it becomes necessary to remove one of the radiators the entire system has to be drained, for if a radiator is disconnected without emptying the system, even though both of the valves of the radiator are closed, all of the water in the radiator will escape into the room in which the radiator is located, owing to the fact that the valves are so constructed that they act as closures only for the supply and return pipes that lead into and out of the radiator. Consequently, a great deal of trouble is experienced and time consumed in making repairs or changes in a hot water heating system provided with valves of the type now in general use, and another objectionable feature is, that the entire system is out of service while the repairs are being made, notwithstanding the fact that only one radiator of the system is being repaired. My improved valve, when used in a hot water heating system, overcomes all of the objectionable features above mentioned, owing to the fact that it comprises a separable body portion, one-half of which is provided with a valve that prevents the water from escaping from one end of the radiator, and the other half being provided with a valve that prevents the water from escaping from the coöperating circulating pipe after the radiator has been disconnected. Each radiator is equipped with two of my improved valves, one for controlling the inlet to the radiator and the other for controlling the outlet from the radiator, so that a disconnected radiator will have both of its ends closed and both of the coöperating supply and return pipes of the system will also be closed, thus preventing the water in the radiator from escaping into the room in which the radiator is located.

Figure 1 of the drawings is a side elevational view of a radiator of a hot water heating system that is equipped with two of my improved valves. Fig. 2 is a vertical, longitudinal sectional view of my valve. Fig. 3 is a similar view, partly in elevation, showing the parts in a different position. Fig. 4 is a detail horizontal sectional view taken on the line 4—4 of Fig. 2. Fig. 5 is a vertical cross-sectional view taken on the line 5—5 of Fig. 2; and Fig. 6 is a detail sectional view of one of the valves of the complete structure.

Referring to the drawings which illustrate the preferred form of my invention, A designates a radiator of a hot water heating system, 1 the supply conduit through which the water is conducted to the radiator and 2 the discharge conduit through which the water is conveyed away from the radiator. One of my improved valves is arranged at each end of the radiator, as shown in Fig. 1, so as to control the supply and discharge of the water to and from the radiator, both of which valves are of the same construction.

The complete valve consists of a separable body portion composed of two parts or sections 3 and $3^a$ that are provided with separate and distinct valves 4 and $4^a$, said parts or sections 3 and $3^a$ being joined together in such a manner that they can be detached or separated easily when it is desired to remove the radiator or disconnect it from the circulating pipes of the system. In the embodiment of my invention herein shown the two halves or parts 3 and $3^a$ of the body portion of the valve are joined together by means of a sleeve 5 that is loosely mounted on the part 3, and which is provided at one end with an externally screw-threaded portion that is normally surrounded by an internally screw-threaded collar $5^a$ which is loosely mounted on the section $3^a$ of the body portion of the valve, said sleeve and collar being provided at their outer ends with beveled seats or ground joints that snugly embrace oppositely beveled surfaces formed on annular flanges 6 and $6^a$ on the parts 3 and $3^a$, respectively. The two parts or sections of the body portion of the valve are similarly constructed and each consists of a tubular-shaped member provided at its outer end with an externally screw-threaded portion for connecting it to the conduit or object with which the valve is used, the part 3 of the valve herein shown being screwed into one end of the radiator and the coöperating part $3^a$ being screwed into an elbow 7 that forms part of the water circulating system. The members 3 and $3^a$ are provided at their inner ends with end walls 8 and $8^a$, respectively, each of which has an opening or openings 9 therein, as shown in Fig. 5, through which the water can flow when the valves 4 and $4^a$ are open, as indicated by the arrows in Fig. 2. The seats for the valves 4 and $4^a$ are formed on tubular-shaped members 10 and $10^a$ that project outwardly from the end walls 8 and $8^a$, previously mentioned, and said end walls are also provided with guides 11 and $11^a$ in which the stems 12 and $12^a$ of said valves slide freely, the valves 4 and $4^a$ preferably being of the plunger type and provided with beveled edges that fit snugly in beveled seats in the tubular-shaped portions 10 and $10^a$ on the two sections or parts of the body portion of the valve.

Various means can be used for opening and closing the valves 4 and $4^a$, but I prefer to employ a valve-actuating mechanism that moves both valves simultaneously, and which is so constructed that the valves can be readily disconnected therefrom when it is desired to separate the two halves or sections of the body portion of the valve. The means herein illustrated for actuating the valves 4 and $4^a$ consists of a reciprocating plunger 13, preferably arranged in a stuffing box 14 on the sleeve 5, and valve-actuating plates 15 and $15^a$ detachably connected to said plunger and combined with the stems of said valves in such a manner that the valves will be moved into their closed positions when the plates 15 and $15^a$ are moved upwardly by the plunger 13 and will be moved into their open position when said plates are moved downwardly by said plunger. Said valve plates are guided vertically by ribs or guide-ways 16 and $16^a$ on the end walls of the two sections or parts 3 and $3^a$, and the stems of the valves 4 and $4^a$ are provided with bifurcated portions that straddle or embrace said valve plates, each valve plate having an irregularly shaped slot 17 through which a cross pin 18 on its coöperating valve stem extends so as to positively move the valves into their open and closed positions. The plunger 13 is provided at its inner end with a cross piece or head $13^a$ which normally projects into notches $13^b$ in the valve plates 15 and $15^a$, so as to connect said plunger and valve plates together and also enable said plunger and valve plates to be disconnected easily by giving the plunger 13 a quarter turn, so as to withdraw the head or cross piece at the inner end of same from the coöperating notches in the valve plates. After the plunger 13 has been disconnected from the valve-actuating plates 15 and $15^a$ said plunger can be moved upwardly high enough so that it will not interfere with the longitudinal movement of the sleeve 15 over the part 3 during the operation of disconnecting the radiator, the sleeve 5 being provided on its inner side with a recess or chamber 19 that receives the cross piece or head $13^a$ on the plunger when said plunger is moved upwardly its entire distance, as indicated by broken lines in Fig. 3.

The two sections or parts 3 and $3^a$ of the body portion of the valve are held spaced apart by means of coöperating lugs 20 and $20^a$ on the end walls of said sections, as shown in Fig. 4, and means are provided for holding said sections or parts in a certain position with relation to each other so as to insure the valve-operating plates being properly arranged with relation to each other and to the plunger 13 when the structure is being assembled, the means herein illustrated for properly positioning the two parts 3 and 3ᵃ and holding them in proper position consisting of laterally projecting lugs 21 and 21ᵃ at the inner ends of same, as shown in Fig. 4, that fit in grooves 22 on the inner side of the sleeve 5, as shown more clearly in Figs. 4 and 5. It will be obvious, however, that various other means could be employed for holding the two sections or parts of the body portion of the valve spaced apart and in proper position with relation to each other without departing from the spirit of my invention. Furthermore, while I have illustrated an operating mechanism for the valves consisting of reciprocating plates detachably connected to a manually-operated plunger and joined to the stems of the valves by a slot and pin connection, I do not wish it to be understood that my invention is limited to a valve in which the independent valve portions of same are operated in the manner illustrated and described, for it is immaterial, so far as my broad idea is concerned, what means is employed for opening and closing the valves, so long as said means is of such a character that the two sections or part of the body portion of the structure, together with the valves therein, can be disconnected or separated easily.

When it is desired to disconnect the radiator the plunger 13 of each valve will be moved upwardly into the position shown in Fig. 3, so as to close both of the valves 4 and 4ᵃ, and thus cut off the flow of water through the body portion of the structure. The collar 5ᵃ is then unscrewed from the sleeve 5 and moved longitudinally of the part 3ᵃ into the position shown at right hand end of Fig. 1. After the head on the plunger 13 has been disconnected from the valve-actuating plates 15 and 15ᵃ and said plunger moved upwardly high enough to position the head 13ᵃ thereon in the recess 19 of the sleeve 5, said sleeve can be moved longitudinally of the member 3 into the position shown at the right hand end of Fig. 1. After the parts of the valve at the opposite end of the radiator have been arranged in this same manner the radiator can be moved laterally out of alinement with the supply and return pipes 1 and 2 of the system and a new radiator can be installed or repairs made in the radiator that was removed. In view of the fact that the openings at the opposite ends of the radiators are closed by the valves 4 and the open ends of the circulating pipes 1 and 2 are closed by the valves 4ᵃ, it will be impossible for the water in the radiator to escape into the room or the water in the circulating pipes to escape therefrom. Consequently, my improved valve overcomes the necessity of draining the system when a radiator is to be repaired or removed, and it enables the entire system to be used while one radiator is being changed or repaired, a thing that is impossible in a hot water heating system provided with valves of the construction now in general use.

To assemble the valve the two parts or sections 3 and 3ᵃ of the body portion are arranged in longitudinal alinement with each other so that the coöperating lugs 20 and 20ᵃ will be positioned directly opposite each other, as shown in Fig. 1, and the sleeve 5 and collar 5ᵃ are slipped longitudinally over the parts on which they are mounted and are connected by screwing up the sleeve 5ᵃ so as to draw the two sections 3 and 3ᵃ toward each other to form tight joints between said sleeve and collar and the coöperating beveled surfaces on the two parts of the body portion on which they are mounted. By depressing the plunger 13 and giving it a quarter turn the head 13ᵃ at the inner end of same will be engaged with the valve plates 15 and 15ᵃ, and thus enable the valves 4 and 4ᵃ to be opened and closed at will. I prefer to design the valve-actuating mechanism in such a manner that the valves will be opened when the plunger 13 is depressed so as to eliminate the possibility of the radiator being cut out of service by someone accidentally depressing the plunger 13, but this also is a detail that could be changed without departing from the spirit of my invention.

In order to compensate for any slight inequalities in the valves 4 and 4ᵃ or in the mechanism that actuates said valves, I prefer to connect said valves to their valve stems in such a manner that the stems can move slightly with relation to the valves in case one valve seats before the other, thus insuring both valves being tightly seated when the plunger 13 is moved upwardly its entire distance. One convenient way of accomplishing this is to provide each valve with a shank 24 that fits loosely in the stem of the valve, as shown in Fig. 6, and arrange a coiled compression spring 25 between a stop 26 on said shank and a coöperating abutment 27 on the valve stem. In case one valve seats before the other the stem of the seated valve will give or yield sufficiently to insure the other valve seating before the plunger 13 reaches the limit of its upward movement.

As previously stated, my improved valve is not limited to use with a hot water heating system, but, on the contrary, can be used for various other purposes too numerous to be mentioned. And, furthermore, while I prefer to construct the complete valve in the manner herein shown, it will be obvious that various changes can be made in same without departing from the spirit of my invention, which, broadly stated, consists of a valve having a separable body portion, each section of which is equipped with a valve that forms a closure for the object on which said section is mounted when the body portion of the valve is separated or taken apart.

Having thus described my invention, what I claim, and desire to secure by Letters Patent, is:

1. A valve provided with a separable body portion composed of a plurality of sections that can be taken apart when it is desired to separate the members which the body portion of the valve joins together, oppositely-disposed valves in said sections, each of which acts as a closure for the member or object on which the section is mounted when said sections are separated, and a common operating mechanism for both valves arranged between same and comprising a manually-operated device that can be actuated from the exterior of the body portion of the valve.

2. A valve provided with separable portions, each of which is adapted to be connected to adjacent sections of a passageway, valves in said portions arranged in longitudinal alinement with each other that prevent the contents of said passageway from escaping when the sections of said passageway are taken apart or completely separated from each other, and an operating mechanism for both valves incased in said separable portions and comprising a single actuating device operable from the exterior of said portions for opening and closing both valves simultaneously.

3. A valve having a separable body portion that comprises a plurality of parts that can be completely detached or separated from each other, each of said parts being provided with a valve and a valve seat, means that normally holds said parts together but which is so constructed that said parts can be separated from each other when said valves are seated, devices arranged inside of said body portion for opening and closing said valves, and a manually actuated operating member detachably connected to said devices and projecting outwardly through said body portion so that it can be operated to open and close both valves simultaneously.

4. A valve having a body portion that comprises two halves or sections that are detachably connected together and which are adapted to be taken apart when it is desired to separate the two members between which the valve is arranged, a valve carried by each of said sections that is adapted to act as a closure for a hollow member to which its coöperating section is connected when said sections are taken apart, and a valve-operating member on one of said sections detachably connected to the valves of both sections and adapted to be operated manually for opening and closing said valves when the two sections of the body portion are in normal position.

5. A valve provided with a body portion composed of two sections and a coupling member that normally joins said sections together but which permits said sections to be taken apart, oppositely-moving valves in said body portion, reciprocating devices joined to the stems of said valves by a slot and pin connection and arranged to move at right angles to the direction of movement of the valves, and means for actuating said reciprocating devices to open and close said valves without disturbing said body portion.

6. A valve provided with a separable body portion composed of a plurailty of separable parts, each of which is equipped with a valve and a valve-actuating plate connected with the stem of its coöperating valve by a slot and pin connection and arranged to move in a line approximately at right angles to the direction of movement of the valve, and an operating plunger detachably connected to both of said valve-actuating plates and adapted to be operated to open and close said valves when the parts of said body portion are in normal position.

7. A valve having a separable body portion composed of two halves or sections, a coöperating sleeve and collar on said respective sections for detachably connecting them together, a valve carried by each of said sections, said valves being arranged in longitudinal alinement with each other and an operating member that is normally operative when the two sections of said body portion are in normal position, but which can be disconnected from said valves when it is desired to take the body portion of the valve apart.

8. A valve having a separable body portion that comprises two halves or sections, each of which is adapted to be connected to a hollow object, means for holding said sections in spaced relation, a loose sleeve on one section that coöperates with a loose collar on the other section for joining said sections together, a reciprocaing valve in each section that coöperates with a seat on the section, valve-actuating plates operatively connected with the stems of said valves, and a plunger on said sleeve detachably connected to said valve-actuating plates.

9. A valve having a separable body portion that comprises two halves or sections, coöperating lugs on said sections that hold them spaced apart, a sleeve and collar for detachably connecting said sections together, a valve and a valve-actuating device carried by each section, means for holding said sections in a certain position with relation to each other, and an operating member detachably connected to said valve-actuating devices.

10. A valve having a separable body portion that comprises two halves or sections consisting of tubular-shaped members arranged in longitudinal alinement with each other and provided at their inner ends with end walls, a collar and sleeve for joining said sections together, a reciprocating valve in each of said sections that coöperates with an annular seat carried by the end wall of the sections, reciprocating valve-actuating plates operatively connected with the stems of said valves and guided by devices on the end walls of said sections, an operating plunger provided with a head that is adapted to enter coöperating notches in said valve-actuating plates when said plunger is arranged in a certain position, and a recess or chamber in said sleeve for receiving the head on said plunger when the body portion of the valve is being taken apart.

In testimony whereof I hereunto affix my signature in the presence of two witnesses, this twenty ninth day of December 1914.

GUSTAVE P. BOPP.

Witnesses:
WELLS L. CHURCH,
GEORGE BAKEWELL.